United States Patent
Wang et al.

(10) Patent No.: US 6,924,976 B2
(45) Date of Patent: Aug. 2, 2005

(54) MOUNTING APPARATUS FOR DATA STORAGE DEVICE

(75) Inventors: Li-Yuan Wang, Tu-chen (TW); Yuan-Lin Hsu, Tu-Chen (TW); Li-Ping Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 208 days.

(21) Appl. No.: 10/453,797

(22) Filed: Jun. 2, 2003

(65) Prior Publication Data

US 2004/0196626 A1 Oct. 7, 2004

(30) Foreign Application Priority Data

Apr. 4, 2003 (TW) .......................................... 92205312

(51) Int. Cl.⁷ ................................................. G06F 1/16
(52) U.S. Cl. ...................... 361/685; 361/683; 361/684; 312/331.1; 292/19
(58) Field of Search .................................. 361/683–685, 361/712–717, 722–737, 740, 747, 752, 753; 439/152, 155, 159, 169, 353, 376, 377, 928.1; 312/223.2, 223.3, 331.1, 265.6, 332.1, 319.1, 333; 292/19, 87, 91; 174/138 G; 248/27.1, 27.3

(56) References Cited

U.S. PATENT DOCUMENTS

| | | | | |
|---|---|---|---|---|
| 5,488,538 A | * | 1/1996 | Wakita ........................ | 361/685 |
| 5,579,204 A | * | 11/1996 | Nelson et al. ............... | 361/685 |
| 5,768,099 A | * | 6/1998 | Radloff et al. ............... | 361/685 |
| 6,069,789 A | * | 5/2000 | Jung ............................ | 361/684 |
| 6,252,766 B1 | * | 6/2001 | Radloff ........................ | 361/683 |
| 6,392,879 B1 | * | 5/2002 | Chien .......................... | 361/685 |
| 6,452,792 B1 | * | 9/2002 | Chen ........................... | 361/685 |
| 6,606,241 B2 | * | 8/2003 | Moore ......................... | 361/685 |
| 6,657,868 B1 | * | 12/2003 | Hsue ........................... | 361/728 |
| 6,775,132 B2 | * | 8/2004 | Chen et al. ................. | 361/685 |
| 6,826,045 B2 | * | 11/2004 | Chen ........................... | 361/685 |
| 2004/0125556 A1 | * | 7/2004 | Chen et al. ................. | 361/685 |

FOREIGN PATENT DOCUMENTS

TW       80212451      1/1992

* cited by examiner

Primary Examiner—Michael Datskovskiy
(74) Attorney, Agent, or Firm—Wei Te Chung

(57) ABSTRACT

A mounting apparatus includes a support member (30), a pair of lock members (20) and a plurality of fasteners (40). The support member adapted for receiving a data storage device (10) thereon includes a main board (32) and a front board (34). A pair of hooks (322) is arranged on the main board. The front board defines an opening (342) for extension of the data storage device therethrough. The lock member for securing the data storage device to the support member includes a lateral plate (22) and a bottom plate (24). Each of lock members has a symmetrical configuration about a central transverse axis thereof. The bottom plate defines at least one locking slot (242) engagingly receiving a corresponding one of the hooks. The fasteners fixedly secure the bottom plates of the lock members to the support member.

15 Claims, 6 Drawing Sheets

MOUNTING APPARATUS FOR DATA STORAGE DEVICE

BACKGROUND OF THE INVENTION

1. Field of the Invention

The present invention relates generally to apparatuses for mounting computer components within a computer enclosure, and more particularly to a mounting apparatus for easily installing and removing data storage devices such as floppy disk drives.

2. Related Art

Many computer systems utilize a number of peripheral devices and/or internally mounted devices for performing various functions required by the system and its users. For example, a data storage device is an internally mounted device used in many computers. These devices are generally placed in mounting apparatuses within a computer chassis.

Taiwan Patent Application No. 80212451 discloses a mounting apparatus for data storage device, the mounting apparatus comprising a pair of generally U-shaped support racks and a front panel. Each support rack defines a plurality of large and small holes and slots. A plurality of fasteners extends through such holes and slots to secure the support racks to lateral sides of the data storage device. The front panel respectively engages with the pair of support racks and the data storage device. Thus the data storage device is secured in the mounting apparatus, and is then mounted to a computer chassis. However, the support rack has an unduly complex configuration, with numerous holes and slots defined therein. Such configuration increases the manufacturing costs of the support racks. In addition, the holes and slots make the above-described assembly operation unduly cumbersome and time consuming.

SUMMARY OF THE INVENTION

Accordingly, an object of the present invention is to provide a mounting apparatus with a simple structure for easily installing and removing a data storage device.

To achieve the above-mentioned object, a mounting apparatus in accordance with a preferred embodiment of the present invention includes a support member, a pair of lock members and a plurality of fasteners. The support member adapted for receiving a data storage device thereon includes a main board and a front board. A pair of hooks is arranged on the main board. The front board defines an opening for extension of the data storage device therethrough. The lock member for securing the data storage device to the support member includes a lateral plate and a bottom plate. Each of lock members has a symmetrical configuration about a central transverse axis thereof. The bottom plate defines at least one locking slot engagingly receiving a corresponding one of the hooks. The fasteners fixedly secure the bottom plates of the lock members to the support member.

Other objects, advantages and novel features of the present invention will be drawn from the following detailed description of preferred embodiments of the present invention with the attached drawings, in which:

DESCRIPTION OF THE PREFERRED EMBODIMENTS

Figure 1:
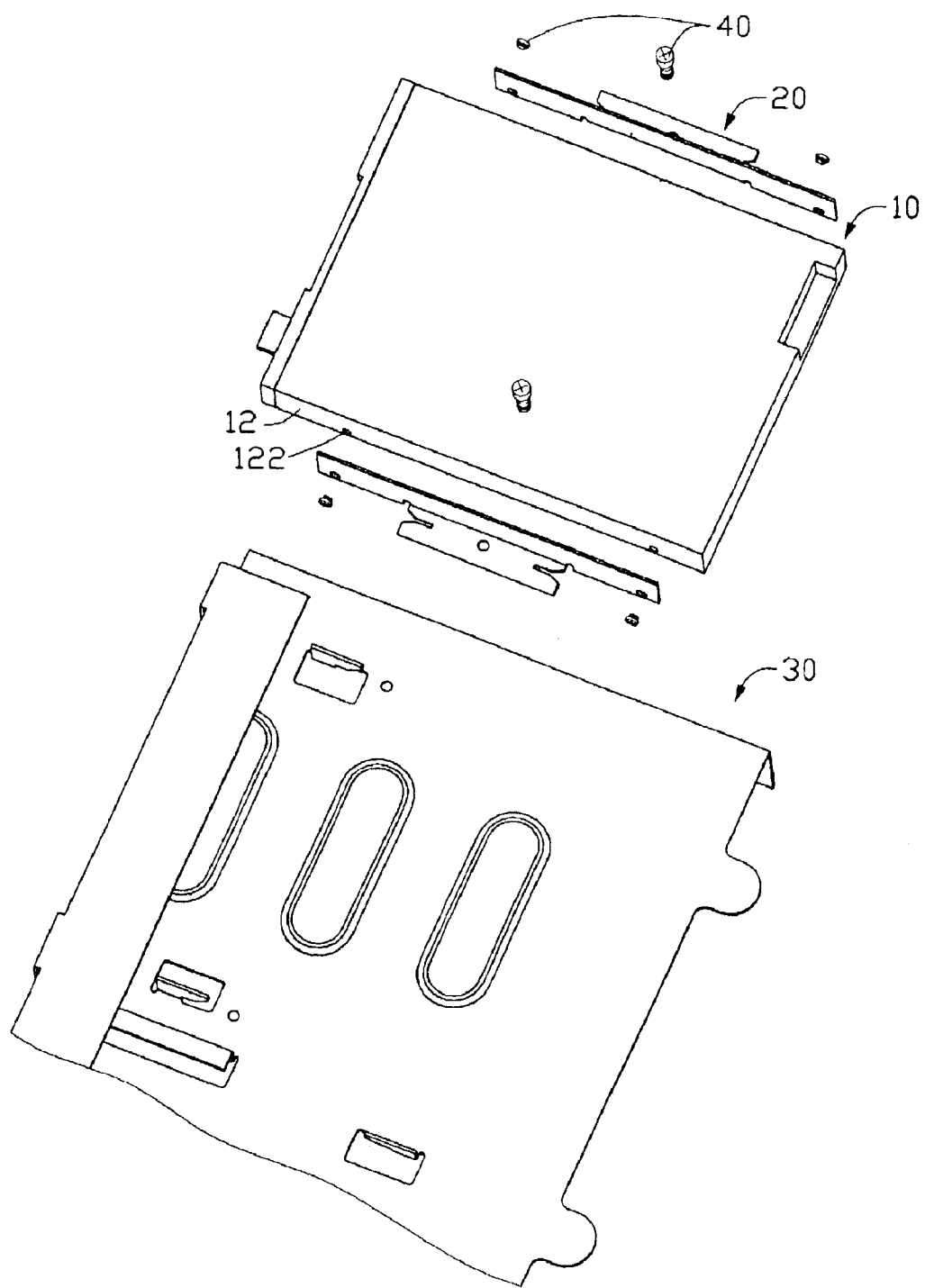
FIG. 1 is an exploded, isometric view of a mounting apparatus in accordance with the preferred embodiment of the present invention, together with a data storage device.

FIG. 1 shows a mounting apparatus in accordance with the preferred embodiment of the present invention together with a data storage device 10. The mounting apparatus comprises a pair of lock members 20, a support member 30, and a plurality of fasteners 40. The lock members 20 secure the data storage device 10 to the support member 30. The data storage device 10 comprises a pair of opposite lateral walls 12. Each lateral wall 12 defines a pair of spaced locking holes 122 therein.

Figure 2:
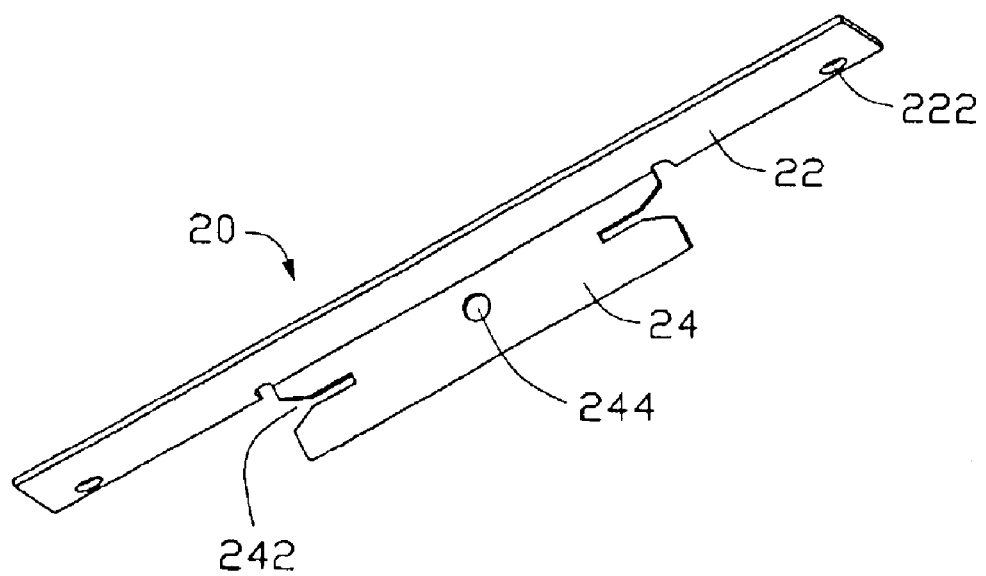
FIG. 2 is an enlarged, isometric view of one of two lock members of the mounting apparatus of FIG. 1, but viewed from another aspect.

Referring to FIG. 2, each lock member 20 has a symmetrical configuration about a central transverse axis thereof. Each lock member 20 comprises a lateral plate 22, and a bottom plate 24 perpendicular to the lateral plate 22. The lateral plate 22 defines a pair of spaced first through holes 222 therein, corresponding to a respective pair of the locking holes 122 of the data storage device 10. Two opposite ends of the bottom plate 24 each define a generally Y-shaped locking slot 242 therein. A second through hole 244 is defined in a center portion of the bottom plate 24.

Figure 3:
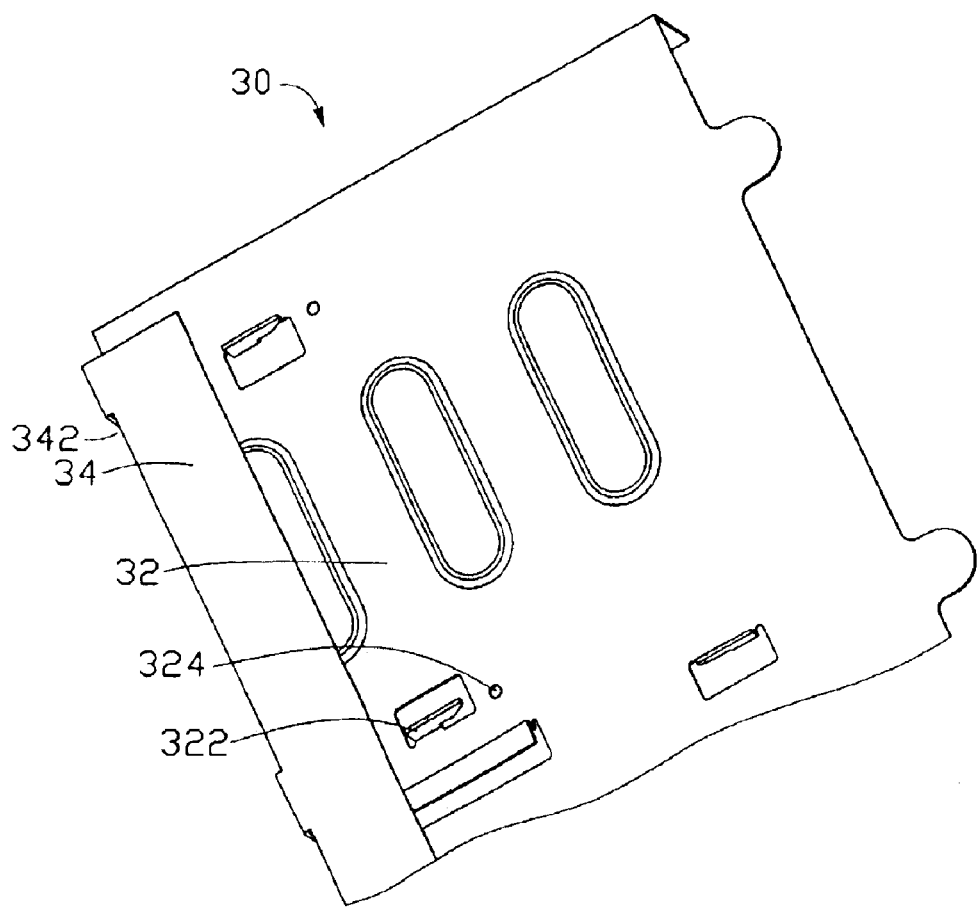
FIG. 3 is an isometric view of a support member of the mounting apparatus of FIG. 1, but viewed from another aspect.

Referring to FIG. 3, the support member 30 comprises a main board 32. A front board 34 is bent from an edge portion of the main board 32, such that a main portion of the front board 34 is above and parallel to the main board 32. A large opening 342 is defined in a proximal portion of the front board 34, for extension of the data storage device 10 therethrough. A pair of hooks 322 is stamped upwardly from the main board 32 generally at opposite sides of the opening 342, for engaging in corresponding locking slots 242 of the lock members 20. A pair of locking holes 324 is defined in the main board 32 adjacent the hooks 322 respectively, corresponding to the first through holes 222 of the lock members 20.

Figure 4:
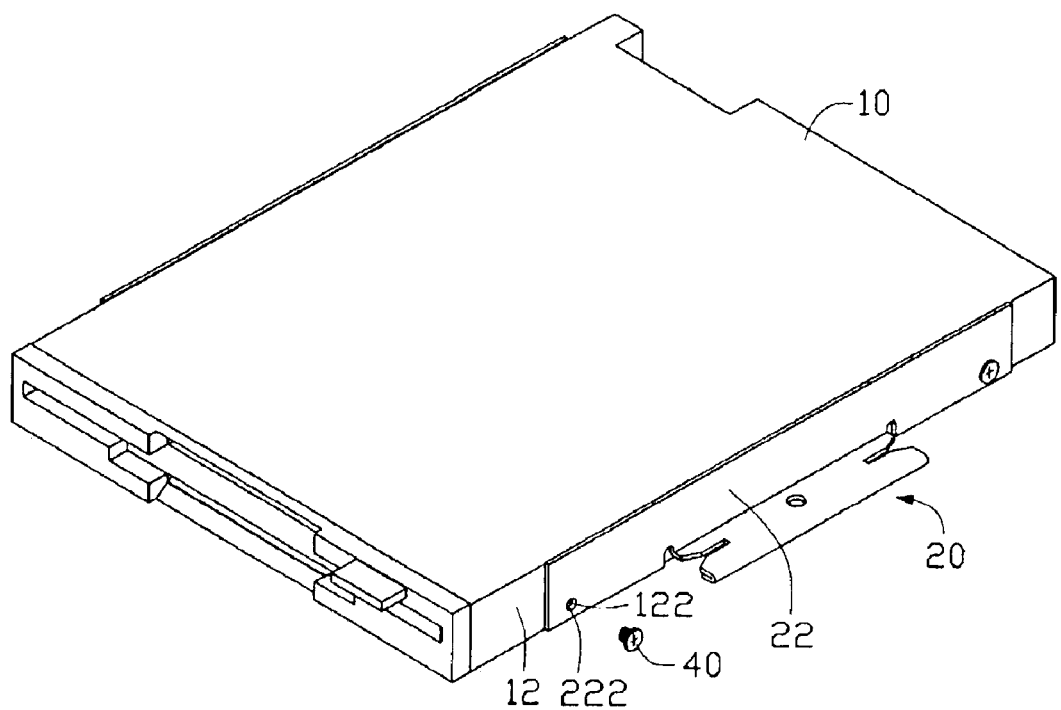
FIG. 4 is a partly assembled view of the data storage device and the lock members of the mounting apparatus of FIG. 1.
Figure 5:
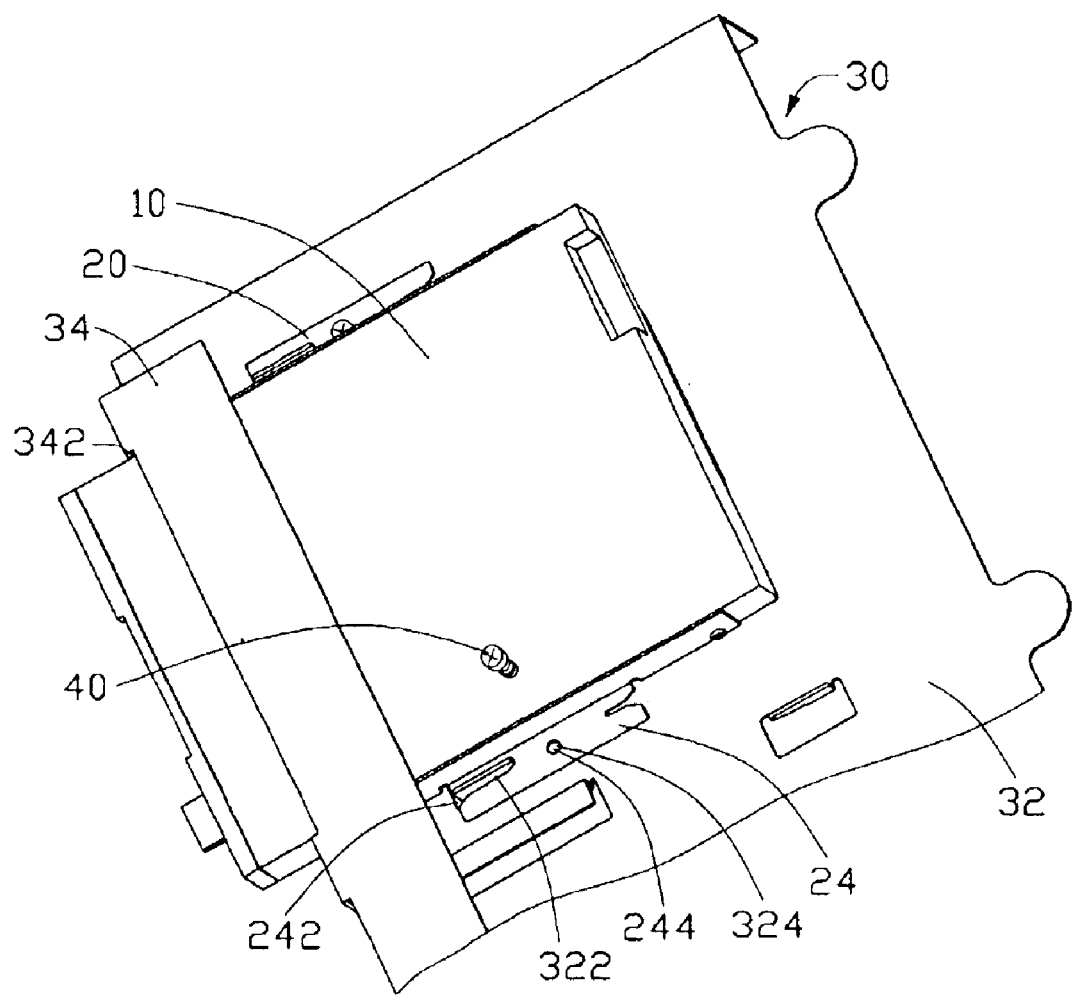
FIG. 5 is a filly assembled view of FIG. 1.

Referring to FIGS. 4–5, in assembly, the lateral plate 22 of each lock member 20 is placed against a corresponding lateral wall 12 of the data storage device 10, and the first through holes 222 are aligned with the corresponding locking holes 122. A pair of the fasteners 40 is extended through the first through holes 222 to engage in the locking holes 122, thereby securing the lock member 20 to the data storage device 10. The combined data storage device 10 and lock members 20 is placed on a rear portion of the main board 32 of the support member 30, and pushed toward the opening 342 of the front board 34. The two frontmost locking slots 242 of the lock member 20 engagingly receive the hooks 322 of the support member 30, and the second through holes 244 of the lock members 20 are aligned with the locking holes 324 of the support member 30. Another pair of the fasteners 40 is extended through the second through holes 244 and locking holes 324 to attach the combined data storage device 10 and lock member 20 to the support member 30. Thus the data storage device 10 is securely mounted in the mounting apparatus of the present invention.

Figure 6:
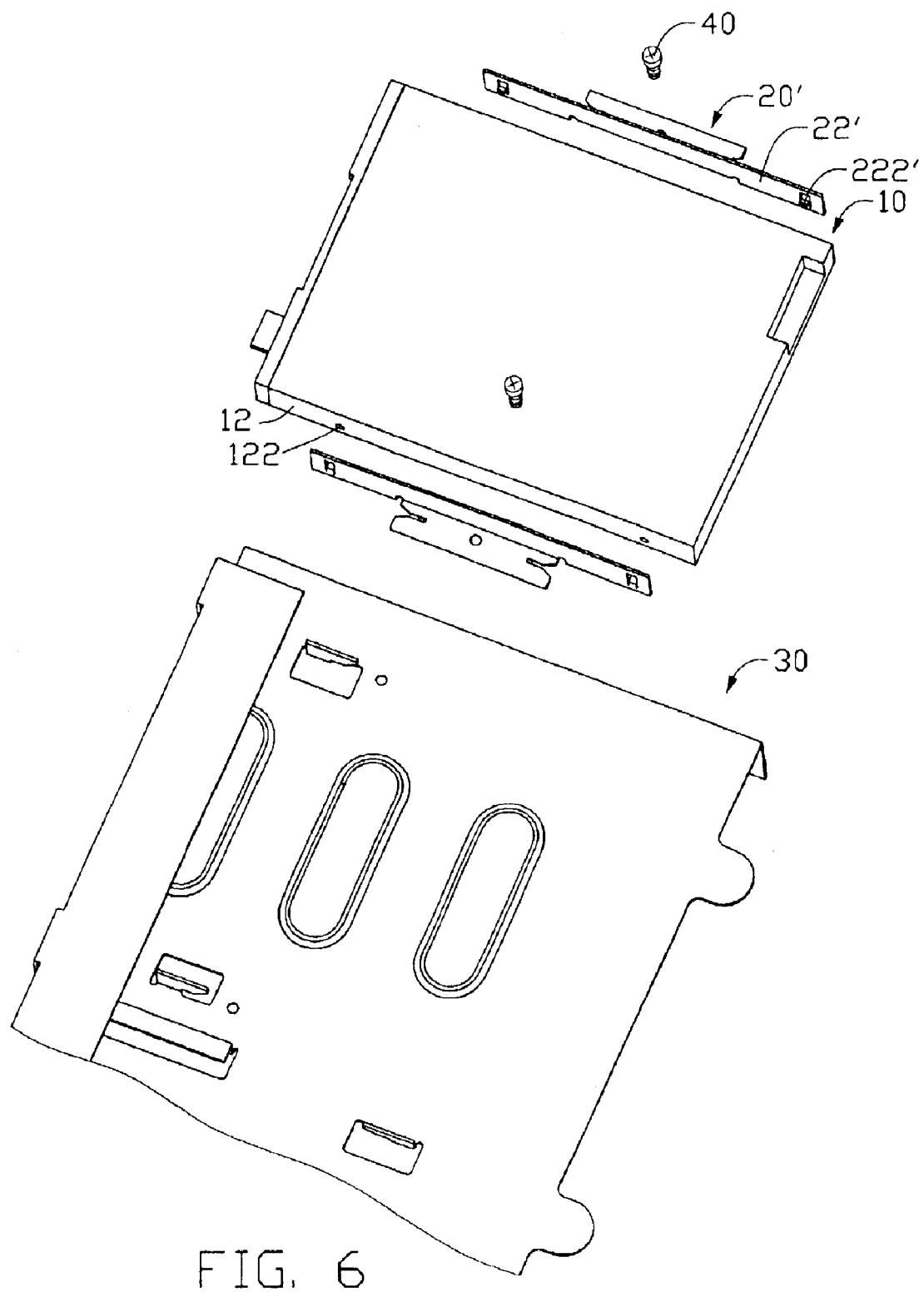
FIG. 6 is an exploded, isometric view of a mounting apparatus in accordance with an alternative embodiment of the present invention, together with a data storage device.

Referring to FIG. 6, a mounting apparatus for data storage device in accordance with an alternative embodiment of the present invention comprises a data storage device 10, a pair of lock members 20', a support member 30 and a plurality of fasteners 40. The data storage device 10, support member 30 and fasteners 40 are the same as for the preferred embodiment. The lock members 20' secure the data storage device 10 to the support member 30.

Each lock member 20' is similar to each lock member 20 of the preferred embodiment, except for a lateral plate 22'. The lateral plate 22' comprises a pair of tabs 222' punched inwardly from the lateral plate 22', corresponding to the locking holes 122 of a respective lateral wall 12 of the data storage device 10.

In assembly, the tabs 222' of the lock members 20' are inserted into the locking holes 122 of the data storage device 10, thereby attaching the lock members 20' to the lateral walls 12 of the data storage device 10. Subsequent assembly of the combined data storage device 10 and lock members 20' to the support member 30 is substantially the same as that described above in relation to the mounting apparatus of the preferred embodiment.

The lock members 20, 20' each have a symmetrical configuration about a central transverse axis thereof, so that each of the lock members 20, 20' can be respectively attached to either lateral wall 12 of the data storage device 10. Thus only one mold is needed to manufacture the lock members 20, 20' respectively, and manufacturing costs are accordingly reduced.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A mounting apparatus for data storage device, comprising:
   a support member adapted for receiving a data storage device thereon, the support member comprising a main board and a front board, a pair of hooks being arranged on the main board, the front board defining an opening for extension of the data storage device therethrough;
   a pair of lock members for securing the data storage device to the support member, each of the lock members comprising a lateral plate and a bottom plate, the lateral plate adapted for being attached to the data storage device, the bottom plate defining at least one locking slot engagingly receiving a corresponding one of the hooks; and
   a plurality of fasteners fixedly securing the bottom plates of the lock members to the support member.

2. The mounting apparatus as claimed in claim 1, wherein each of the lock members has a symmetrical configuration about a central transverse axis thereof.

3. The mounting apparatus as claimed in claim 2, wherein the at least one locking slot is defined in at least one of opposite ends of the bottom plate of the lock member, the at least one locking slot is generally Y-shaped.

4. The mounting apparatus as claimed in claim 1, wherein the data storage device comprises a pair of opposite lateral walls, and each of the lateral walls defines a pair of locking holes therein.

5. The mounting apparatus as claimed in claim 4, wherein the lateral plate of each of the lock members defines a pair of first through holes corresponding to respective locking holes of the data storage device, and a pair of fasteners extends through said first through holes to engage in said locking holes thereby securing the lock member to a respective lateral wall of the data storage device.

6. The mounting apparatus as claimed in claim 4, wherein a pair of tabs is punched inwardly from the lateral plate of each of the lock members, corresponding to the locking holes of a respective lateral wall of the data storage device, the tabs being received in said locking holes to secure the lock member to the respective lateral wall of the data storage device.

7. The mounting apparatus as claimed in claim 1, wherein the support member defines a pair of locking holes in the main board adjacent the hooks, the bottom plate of each of the lock members defines a second through hole, and two fasteners extend through the second through holes of the lock members and engage in said locking holes thereby fixedly securing the lock members to the support member.

8. A mounting apparatus assembly comprising:
   a data storage device;
   a support member receiving the data storage device thereon, the support member comprising a pair of hooks;
   a pair of lock members attached on opposite sides of the data storage device, each of the lock members defining at least one locking slot engagingly receiving a corresponding one of the hooks; and
   a plurality of fasteners fixedly securing the lock members to the support member;
   wherein each of the lock members has a symmetrical configuration about a central transverse axis thereof.

9. The mounting apparatus assembly as claimed in claim 8, wherein the data storage device comprises a pair of opposite lateral walls, and each of the lateral walls defines a pair of locking holes therein.

10. The mounting apparatus assembly as claimed in claim 8, wherein the support member comprises a main board and a front board, the hooks are arranged on the main board, and the front board defines an opening for extension of the data storage device therethrough.

11. The mounting apparatus assembly as claimed in claim 9, wherein each of the lock members comprises a lateral plate and a bottom plate, the at least one locking slot is defined in at least one of opposite ends of the bottom plate, and the at least one locking slot is generally Y-shaped.

12. The mounting apparatus assembly as claimed in claim 11, wherein the lateral plate of each of the lock members defines a pair of first through holes corresponding to respective locking holes of the data storage device, and a pair of fasteners extends through said first through holes of the lock member to engage in said locking holes thereby securing the lock member to a respective lateral wall of the data storage device.

13. The mounting apparatus assembly as claimed in claim 11, wherein a pair of tabs is punched inwardly from the lateral plate of each of the lock members, corresponding to the locking holes of a respective lateral wall of the data storage device, the tabs being received in said locking holes to secure the lock member to the respective lateral wall of the data storage device.

14. The mounting apparatus assembly as claimed in claim 10, wherein the support member defines a pair of locking holes in the main board adjacent the hooks, the bottom plate of each of the lock members defines a second through hole, and two fasteners extend through the second through holes of the lock members and engage in said locking holes thereby fixedly securing the lock members to the support member.

15. A mounting apparatus assembly comprising:
   a data storage device;

a pair of lock members laterally attached unto tw corresponding exterior faces of the storage device;

a support member defining a two parallel plates with a vertical opening therebewteen to allow said data storage device extending therethough and sandwiched between said two parallel plates; and one of said lock member and the support member defining a hook and the other of said lock member and the support member defining a locking slot to receive said hook therein so as to allow the data storage device to move initially along the support member in a front-to-back direction and successively preventing the data storage device from moving in a lateral direction perpendicular to said front-to-back direction; wherein a fastener extends in a vertical direction perpendicular to both said front-to-back direction and said lateral direction to securing said data storage device and said support member once said data storage device is moved to a final locked position.

* * * * *